Sept. 16, 1952        G. B. PACE        2,610,888
PIPE HANDLING MECHANISM
Filed Nov. 14, 1946        3 Sheets-Sheet 1
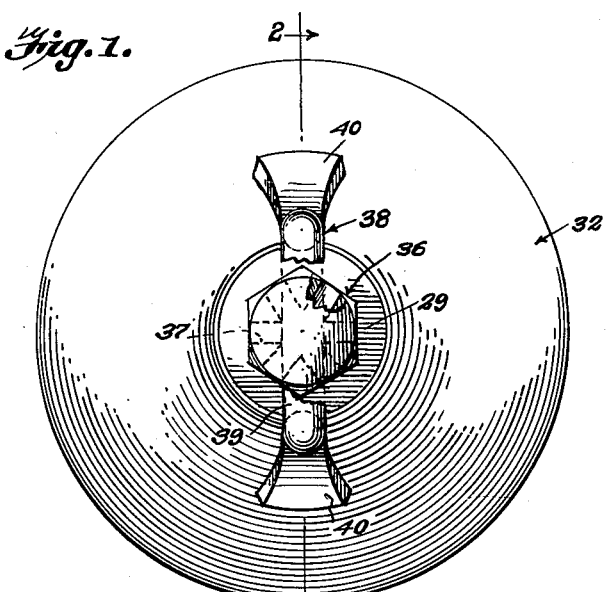
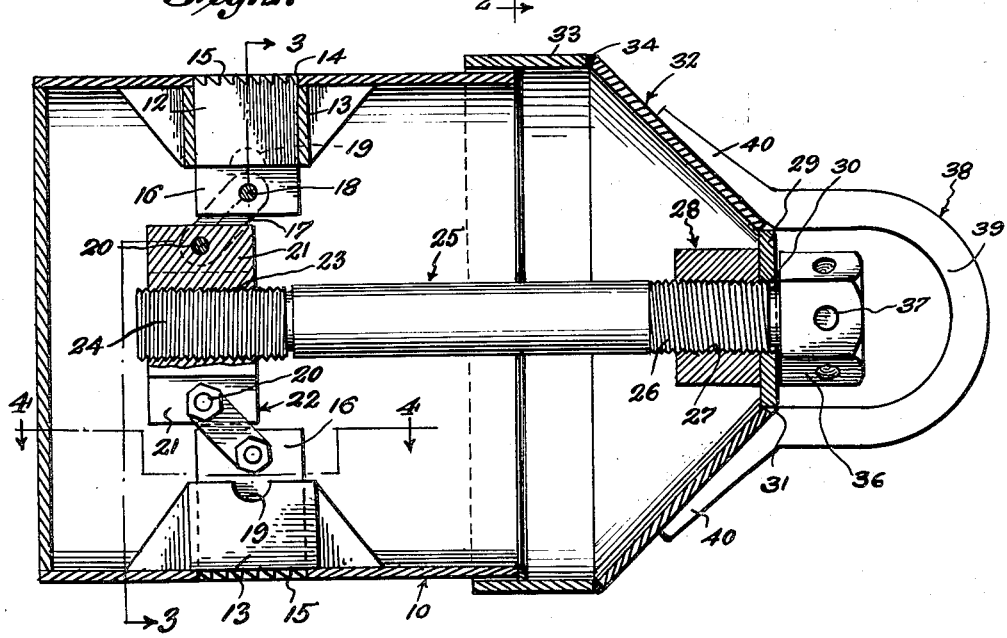
INVENTOR
GARLAND B. PACE
BY        ATTORNEY Sept. 16, 1952   G. B. PACE   2,610,888
PIPE HANDLING MECHANISM
Filed Nov. 14, 1946   3 Sheets-Sheet 2

INVENTOR
GARLAND B. PACE
BY
ATTORNEY

Sept. 16, 1952   G. B. PACE   2,610,888
PIPE HANDLING MECHANISM
Filed Nov. 14, 1946   3 Sheets-Sheet 3
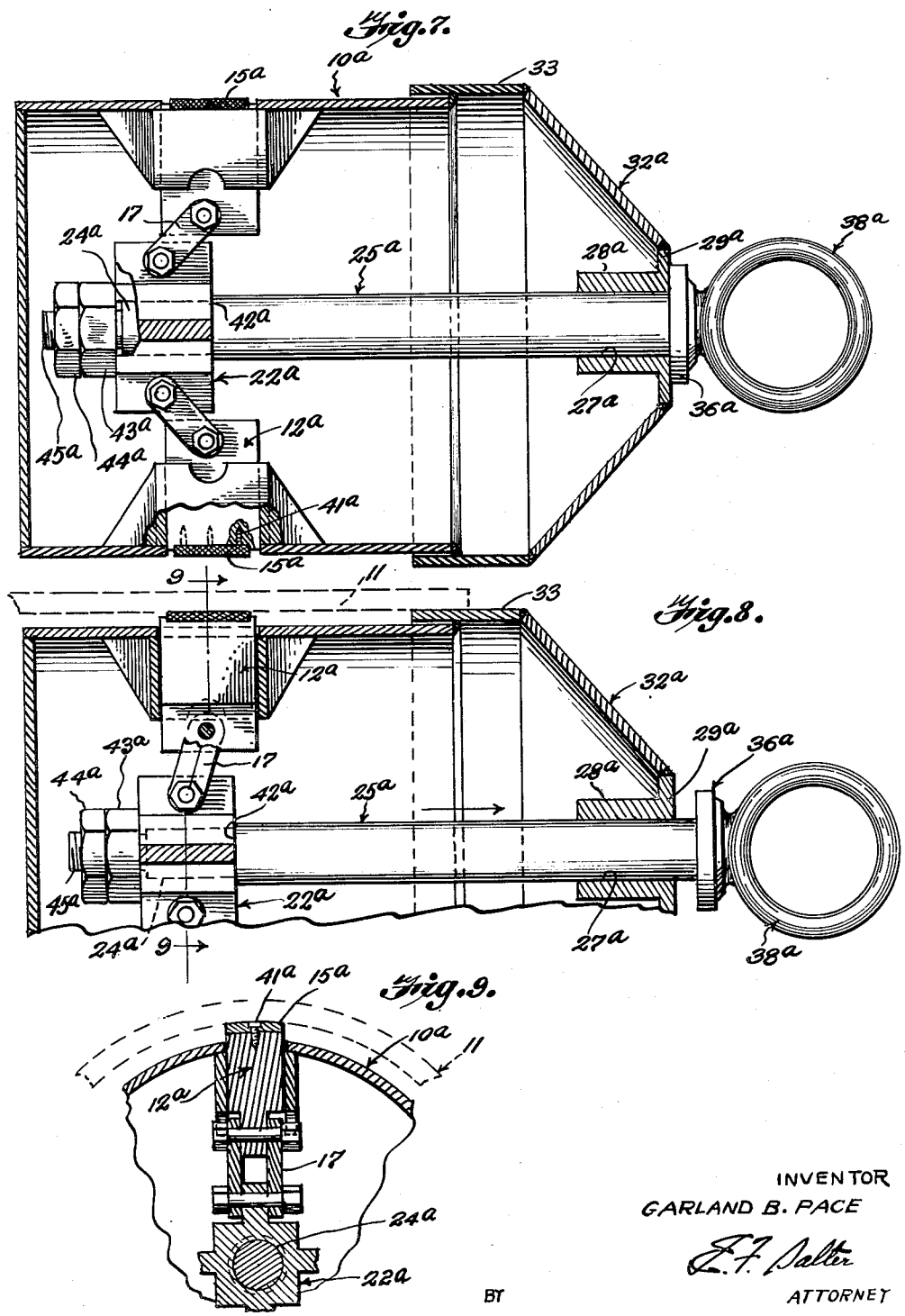
INVENTOR
GARLAND B. PACE
ATTORNEY Patented Sept. 16, 1952

2,610,888

UNITED STATES PATENT OFFICE 2,610,888

PIPE HANDLING MECHANISM

Garland B. Pace, Camp Hill, Pa., assignor to Pipe Line Construction and Drilling Company, Pineville, W. Va., a corporation of Delaware Application November 14, 1946, Serial No. 709,819

3 Claims. (Cl. 294—93)

1

This invention relates to pipe handling equipment especially adapted for use in manipulating large size pipe, such as employed in oil, water and sewerage lines.

An important object of the invention is to provide a pipe handling mechanism which may be readily inserted into and secured in one end of the pipe to be handled and having means enabling a hoisting or towing cable or chain to be connected thereto for hoisting, towing or otherwise manipulating the pipe.

Another object of the invention is to provide a mechanism of the character indicated which will protect and close the end of the pipe with which it is associated so as to prevent the entrance of foreign matter into the pipe while it is being hoisted or towed over the ground.

A further object of the invention resides in the provision of a pipe handling mechanism having means for camming it and the associated pipe over and away from obstructions, such as trees, rocks, etc., encountered in the towing or hoisting of the pipe.

Other objects and advantages will be apparent from the following description and the accompanying drawings wherein two embodiments of the invention are disclosed in detail.

In the drawings:

Figure 1 is a front elevational view of one form of the invention.

Figure 2 is a longitudinal section therethrough substantially on the line 2—2 of Figure 1, and showing the locking or gripping dogs in retracted position.

Figure 7 is a longitudinal section taken through another embodiment of the invention, showing the dogs in retracted position.

Figure 8 is a fragmentary view similar to Figure 7 but showing the dogs in expanded position.

Figure 9 is a fragmentary transverse section taken substantially on the line 9—9 of Figure 8.

Figure 3:
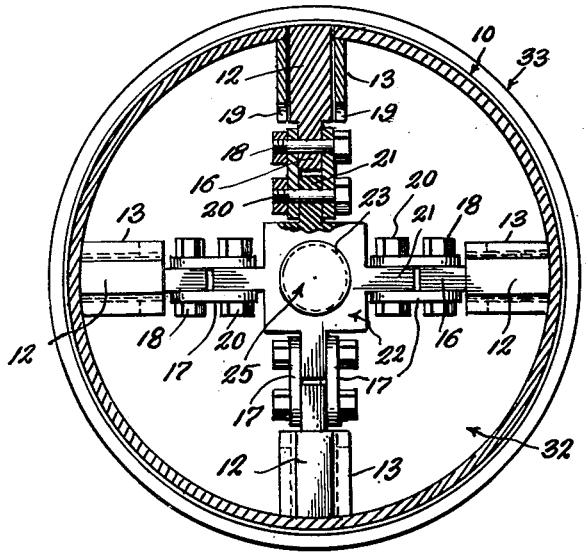
Figure 3 is a transverse section taken on the line 3—3 of Figure 2.
Figure 6:
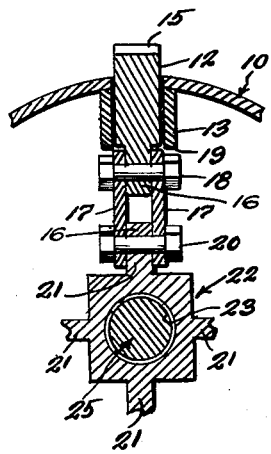
Figure 6 is a fragmentary transverse section taken on the line 6—6 of Figure 5.
Figure 4:
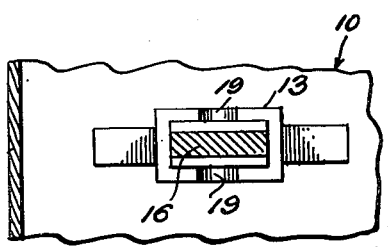
Figure 4 is a fragmentary longitudinal section taken on the line 4—4 of Figure 2.

In the device shown in Figures 1 to 6, inclusive, the radially movable pipe gripping dogs are retracted from and expanded to engage the interior of the pipe by links connected to a block which is operated along the axis of the device by a screw threaded shaft which is manually turned by means of a wrench or other suitable tool applied to the exposed fore end of the shaft; and in this instance the draft connection to which the handling chain or cable is connected is carried by the forward part of the casing or body of the device.

In the device shown in Figures 7 to 9, inclusive, the pipe gripping dogs are expanded to grip the pipe by operation of a block forwardly along the axis of the device produced by the forward movement of a shaft, to the exposed forward end of which the pipe handling chain or cable is connected; and retraction of the pipe gripping dogs is accomplished by relaxing the pull on the chain or cable and pushing the shaft rearwardly.

Referring in detail to the drawings, wherein like numerals designate like parts throughout the several views, and first to Figures 1 through 6 thereof, the numeral 10 generally designates a cylindrical body or casing of small enough diameter to be inserted easily within the pipe end 11 with sufficient clearance for proper operation of the radially elongated, generally rectangular pipe gripping dogs 12 which slide radially inwardly and outwardly in braced rectangular tubular guides 13 preferably welded to the interior of the cylindrical body 10 in registry with openings 14 formed in the wall of the body at circumferentially spaced points. While four dogs 12 are illustrated, it will be understood that a greater or a smaller number may be employed.

The pipe gripping dogs 12 have their outer ends formed with teeth or serrations 15 and the inner ends 16 of the dogs are cut away on their opposite sides to accommodate links 17 which are pivotally connected to the reduced inner ends of the dogs by pivot bolts 18. The inner edges of opposite side walls of the guides 13 have recesses 19 to accommodate the heads of the bolts 18 and thereby act as stops to prevent further expanding movement of the dogs 12.

The inner ends of the links 17 are pivoted on the opposite ends of pivot bolts 20 which traverse arms 21 radiating from the sides of a substantially square link operating block 22, which is formed with a threaded axial bore 23. It will be noted that in the retracted position of the dogs 12 the links 17 slant rearwardly and that this angulation becomes reduced toward a right angular relation to the operating block 22 as the dogs are expanded by movement of the operating block forwardly or to the right.

The threads in the bore 23 of the operating block 22 are left-hand threads and are engaged by the correspondingly threaded rear end 24 of a longitudinally movable operating shaft 25 which has adjacent its forward end a right-hand threaded portion 26 turning in a conformably threaded bore 27 of a stationary block 28. The block 28 is secured to a disk 29 having a central opening 30 passing the shaft 25, this disk being welded at 31 to the smaller forward end of a frustro-conical nose 32 projecting forwardly from a short cylindrical portion or ring 33 to which its wider end is welded at 34. The ring 33 is slightly larger in diameter than the body 10 and is welded thereto. This ring 33 may be sized to abut the end of the pipe to be handled or to fit closely in such end and acts in conjunction with the nose 32 to prevent foreign matter from entering the pipe as it is hoisted or dragged over the ground. The conical nose 32 also functions to skid or cam the device and the associated pipe over and away from obstacles and consequently the pipe may be hoisted or towed along the ground without becoming lodged or trapped behind trees, rocks, and other obstructions.

The operating shaft 25 is turned to lock or unlock the dogs 12 by applying a wrench to its nut-like head 36 or inserting a turning bar in the openings 37 of the head 36.

On the nose 32 is a coupling eye 38 to which a towing or hoisting chain or cable is adapted to be connected, the eye 38 consisting of the U-shaped intermediate portion 39 spacedly straddling and protecting two opposite sides and the forward end of the operating shaft head 36, and the flaring terminals 40 which are welded to the sides of the frustro-conical nose 32.

Figure 5:
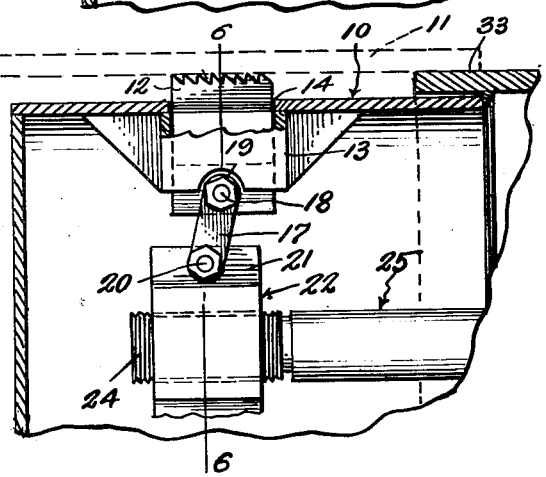
Figure 5 is a fragmentary section on an enlarged scale, similar to Figure 2, but showing one of the dogs in expanded position relative to a pipe end shown in phantom lines.

In use, the body 10 of the device is inserted into one end of the pipe, with its diametrically enlarged portion 33 and conical nose 32 closing the end of the pipe, and a tool is then applied to the head 36 of the operating shaft 25 to turn the shaft in a counter-clockwise direction. This rotation of the shaft imparts forward axial movement to the shaft itself due to the co-action of the right-hand threads 26 with those in the stationary block 28. At the same time that the shaft 25 moves forwardly, its left-hand threads 24 advance the link operating block 22, thereby straightening the links 17 and forcing the dogs 12 outwardly against the inside of the pipe 11, as shown in Figure 5. It will be understood that the combined effect of the reversed threads 26 and 24, halves the distance that the operating shaft need be moved forwardly to lock the dogs 12 and rearwardly to retract the dogs, thereby cutting down the time required for these operations.

The embodiment of the invention shown in Figures 7, 8 and 9 of the drawings differs from the embodiment just described in that forward movement of the operating shaft 25a, and consequently forward movement of the operating block 22a, for expanding the dogs 12a, is produced by a forward pull on a chain or cable attached to the eye 38a which is carried by the forward end of operating shaft 25a instead of the nose 32a of the casing 10a, and rearward movement of the shaft 25a for retracting the dogs 12a is produced by pushing rearwardly upon the eye 38a. Further, the outer ends of the dogs 12a have renewable lagging 15a, instead of the teeth 15, held in place by suitable means, such as screws 41a, as shown in Figures 7 and 9.

In the presently described embodiment, the stationary shaft supporting block 28a and disk 29a are integral and the bore 27a in the block 28a is smooth to slidably receive the smooth forward part of the operating shaft 25a. The shaft head 36a is in the form of an annulus to the forward end of which the circular eye 38a is fixed.

The operating block 22a has a smooth bore through which extends a smooth reduced portion 24a of the operating shaft 25a. The block 22a abuts a shoulder 42a defined by the reduced portion 24a and is locked by a nut 43a followed by a locknut 44a threaded on a rearward extension 45a of the shaft whereby the operating block 22a is secured against longitudinal movement along the operating shaft.

I claim:

1. A pipe handling device comprising a substantially cylindrical body for insertion into one end of a pipe to be towed or hoisted, a conical nose closing the front end of said body and acting to cam the device and the associated pipe over and away from obstacles encountered in the hoisting or towing of the pipe, a plurality of circumferentially spaced, radial guides mounted in said body and opening through the periphery thereof, radially operable dogs working in said guides, a rotatable and axially movable operating shaft threadedly supported in said nose and extending into said body and forwardly beyond said nose, a block threadedly mounted on said shaft and axially movable therewith, the threaded connection between said block and said shaft being of a hand opposite that of the threaded connection between said shaft and said nose, means connecting said block to said dogs for moving said dogs into and out of gripping engagement with the pipe upon actuation of said operating shaft, and means carried by said device providing for its connection to a suitable towing or hoisting mechanism.

2. A pipe handling device comprising a substantially cylindrical body for insertion into one end of a pipe to be towed or hoisted, said body having a closed front end of conical shape to cam the device and the associated pipe over or away from obstacles encountered in the hoisting or towing of the pipe, radial guides mounted at circumferentially spaced points around the body and opening through the periphery thereof, radially extensible and retractible dogs working in said guides, a block arranged in said body and adapted to be moved axially thereof, links extending between and pivotally connected to said dogs and said block, said links being rearwardly angulated whereby forward movement of said block will extend said dogs to grip the interior of the pipe and lock the device therein and rearward movement of said block will retract said dogs out of contact with the interior of the pipe and release the device therefrom, said operating block being formed with a bore having left-hand threads, an operating shaft axially arranged in said body and having a portion provided with left-hand threads threaded in the bore of said operating block, a supporting block fixed in the conical front end of said body and formed with a right-hand threaded bore registered with an opening provided in the conical front end of said body, said operating shaft having a right-hand threaded portion threaded through said right-hand threaded bore of said supporting block, said operating shaft projecting forwardly through and beyond the conical front end of said body and provided with a tool engageable head whereby said operating shaft can be rotated to effect axial movement thereof in opposite directions to extend and retract said dogs, and a hoisting and towing eye connected to the front end of said body.

3. A pipe handling device comprising a substantially cylindrical body for insertion into one end of a pipe to be towed or hoisted, a plurality of pipe gripping elements mounted in said body and adapted to be moved into gripping engagement with the interior of the pipe, said body having a shaft fixed supporting member at its front end, a rotatable and axially movable operating shaft threadedly mounted in said supporting member and extending into said body, a block threadedly mounted on said shaft within said body, means connecting said block to said pipe gripping elements for moving said elements into and out of gripping engagement with the pipe upon actuation of said operating shaft, the threaded connection between said block and said shaft being of a hand opposite that of the threaded connection between said supporting member and said shaft, and means carried by said device providing for its connection to a suitable towing or hoisting mechanism.

GARLAND B. PACE.

REFERENCES CITED

The following references are of record in the file of this patent:

UNITED STATES PATENTS

| Number | Name | Date |
| --- | --- | --- |
| 314,243 | Heathcote | Mar. 24, 1885 |
| 434,860 | Bullock | Aug. 19, 1890 |
| 1,266,653 | Barlow | May 21, 1918 |
| 1,508,417 | Spitler | Sept. 16, 1924 |
| 1,764,481 | Watkins | June 17, 1930 |
| 1,804,843 | Santiago | May 12, 1931 |